United States Patent
Reshef et al.

(10) Patent No.: US 11,979,676 B2
(45) Date of Patent: May 7, 2024

(54) ROBUST ANALOG COUNTER

(71) Applicant: Tower Semiconductor Ltd., Migdal Haemek (IL)

(72) Inventors: Raz Reshef, Tel Aviv (IL); Dmitry Dain, Netanya, IL (US)

(73) Assignee: TOWER SEMICONDUCTOR LTD., Migdal-Haemek (IL)

( * ) Notice: Subject to any disclaimer, the term of this patent is extended or adjusted under 35 U.S.C. 154(b) by 56 days.

(21) Appl. No.: 17/660,830

(22) Filed: Apr. 26, 2022

(65) Prior Publication Data

US 2023/0345149 A1 Oct. 26, 2023

(51) Int. Cl.
*H04N 25/75* (2023.01)
*H04N 25/702* (2023.01)

(52) U.S. Cl.
CPC ........... *H04N 25/75* (2023.01); *H04N 25/702* (2023.01)

(58) Field of Classification Search
CPC ............................ H04N 25/75; H04N 25/702
See application file for complete search history.

(56) References Cited

U.S. PATENT DOCUMENTS

2008/0169826 A1* 7/2008 Bartling ........... G01R 31/31725
327/290

* cited by examiner

*Primary Examiner* — Twyler L Haskins
*Assistant Examiner* — Fayez A Bhuiyan
(74) *Attorney, Agent, or Firm* — Reches Patents

(57) ABSTRACT

A robust analog counter that may include an output capacitor having a first capacitance, and a charging unit (CU) that is configured to determine that an event to be counted occurred, and charge the output capacitor at a first current and during a output capacitor charging period, wherein a duration of the output capacitor charging period is proportional to the first capacitance, thereby increasing an output voltage of the output capacitor by a voltage quote that is indifferent to at least one out of process variation, temperature or power supply voltage value.

18 Claims, 3 Drawing Sheets

ROBUST ANALOG COUNTER

BACKGROUND OF THE INVENTION

An analog counter counts events by increasing the voltage over a capacitor by a voltage step. The increment involves injecting an electric charge whenever an event to be counted occurs.

The electric charge (and hence the voltage step) are highly dependent on process variations, temperature and power supply voltage. For example—process variations may change the properties (for example threshold voltage) of one or more transistors of the analog counter.

These dependencies introduce capacitor voltage errors—as a certain value of a capacitor voltage cannot be accurately attributed to the number of events.

There is a growing need to robust analog counter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
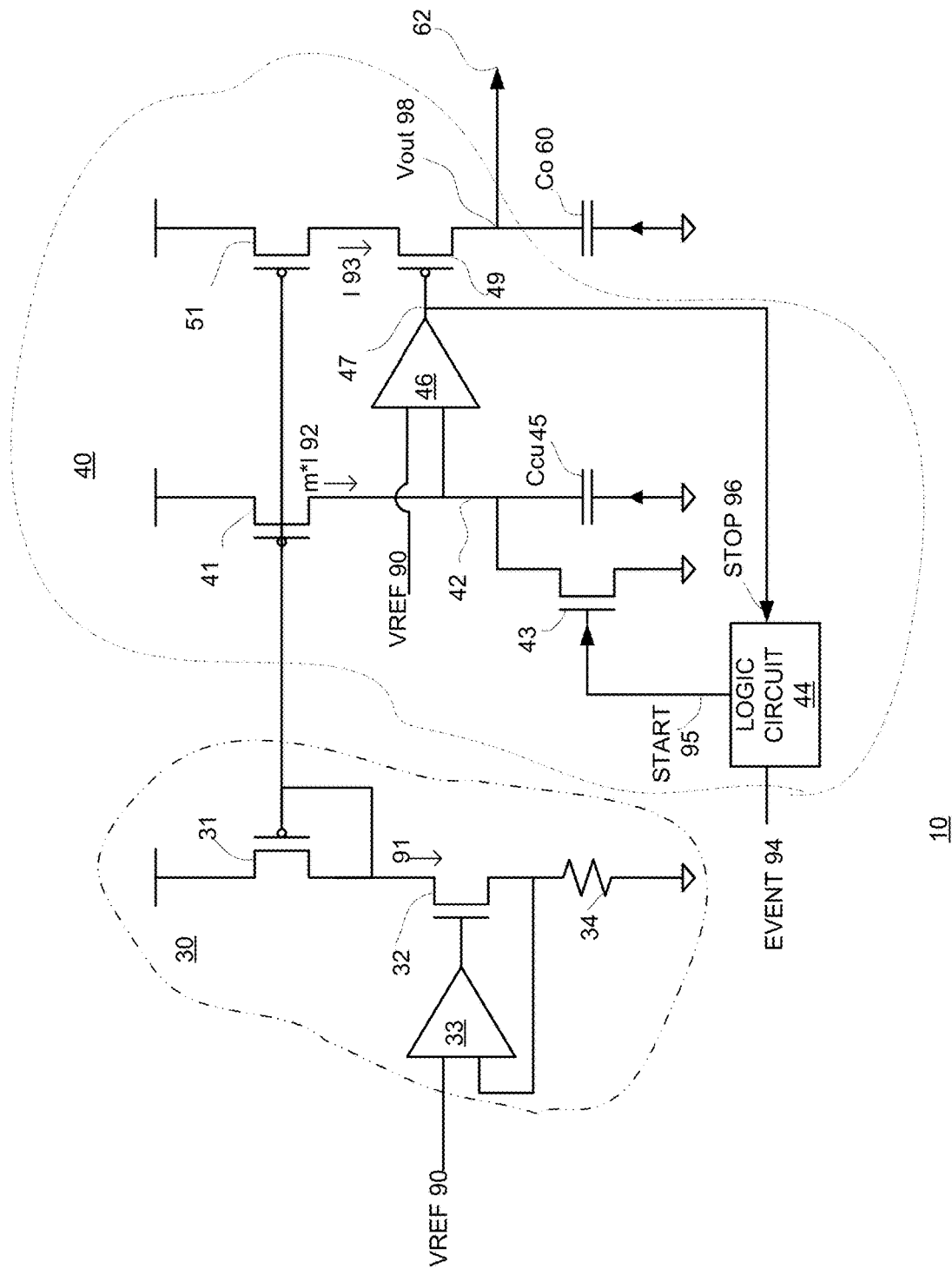
FIG. 1 is an example of a robust analog counter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The term "and/or" means additionally or alternatively. For example—A and/or B—may mean only A, only B, or both A and B.

Any reference to a method should be applied mutatis mutandis to a robust analog counter and/or a module that includes the robust analog counter configured to execute the method.

Any reference to a robust analog counter and/or a module that includes the robust analog counter should be applied mutatis mutandis to a method executable by the robust analog counter and/or a module that includes the robust analog counter.

There may be provided a robust analog counter that is robust in the sense that is counts by increasing an output voltage of an output capacitor by a voltage quote that is indifferent to process variation and/or temperature and/or power supply voltage value.

The voltage quote is proportional to a first current (used to charge the output capacitor), to a value of the output capacitor charging period (a period during which the output capacitor is being charged) and is inversely proportional to a capacitance of the output capacitor. The value of the output capacitance value and/or the value of the first current and/or the output capacitor charging period may be responsive to process variation and/or temperature and/or power supply voltage value.

The impact of the process variation and/or temperature and/or power supply voltage value on the voltage quote may be cancelled by making the duration of the output capacitor charging period be proportional to the capacitance of the output capacitor, be inversely proportional to the first current and be dependent upon a fixed reference voltage.

See, for example, the following equations:

$$(a) V_{CHARGE} = \frac{I * T_{CHARGE}}{n * C}$$

$$(b) T_{CHARGE} = \frac{V_{REF} * C}{m * I}$$

$$(c) V_{CHARGE} = \frac{I * T_{CHARGE}}{n * C} = \frac{I}{n * C} * \frac{V_{REF} * C}{m * I} = \frac{V_{REF}}{n * m}$$

Wherein $V_{CHARGE}$ is the voltage quote, $T_{CHARGE}$ is the duration of the output capacitor charging period, $C*n$ is the capacitance of the output capacitor, C is the capacitance of an charging unit (CU) capacitor, I is the first current, $I*m$ is a CU capacitor charging current, m and n are positive integers.

Referring to FIG. 1—robust analog counter 10 includes an output capacitor (denoted Co) 60 having a first capacitance ($n*C$) and a charging unit (CU) 40.

The CU 40 is configured to determine that an event to be counted occurred (for example—when receiving an EVENT signal 94 of a certain value, and charge the output capacitor 40 at a first current (denoted I 93) and during a output capacitor charging period ($T_{CHARGE}$).

The duration of the output capacitor charging period is proportional to the capacitance of the CU capacitor, thereby increasing an output voltage of the output capacitor by a voltage quote ($V_{CHARGE}$) that is indifferent to process variation and temperature.

The output capacitor charging period is also proportional to a value of a reference voltage ($V_{REF}$ 90). For example—see equation (a).

CU 40 may include CU capacitor (denoted $C_{CU}$) 45 and a CU capacitor charging circuit, wherein the CU capacitor charging unit is configured to charge the CU capacitor between a start point in time in which the event to be counted is detected, and an end point of time in which a voltage of the CU capacitor reaches a value of a reference voltage.

The output capacitor charging period occurs between the start point in time and the end point in time.

In FIG. 1, CU 40 is illustrated as including CU comparator 46 that is configured to compare between the reference voltage (fed to a first input of CU comparator 46) and a voltage of the CU capacitor (the second input of CU comparator 46 is connected to a node 42 that is also connected to an output node of CU capacitor 45. The CU comparator enables the charging of the output capacitor while the voltage of the CU capacitor 45 does not exceed the reference voltage. The CU comparator 45 is a part of the CU capacitor charging circuit.

In FIG. 1 the CU 40 is also illustrated as including logic circuit 44 that is configured to detect the event to be counted. Logic circuit 44 is configured to (a) generate a start signal (START 95) to a CU switch 43 of the capacitor charging circuit—thereby enabling a charging of the CU capacitor 45 and (b) receive an end charging signal (STOP 96) from the CU comparator (especially the output signal of the comparator) and stop the charging of the CU capacitor.

The robust analog counter 10 may also include a reference branch 30 for generating a reference current, a second branch for generating a CU capacitor charging current and a third branch for generating the first current. The robust analog counter 10 is configured to maintain a relationship between a value of the reference current 91, the CU capacitor charging current (having a value of m*I) 92 and the first current (having a value of I) 93. The maintaining of the relationship may be performed using current mirroring techniques while allowing different branch to supply currents that differ from each other—while maintaining the ratios between values of currents of different branches. The ratios may be maintaining in any manner—for example by coupling the gate of a first CU transistor 41 (of the second branch, the second branch also include CU capacitor 45), the gate of a reference transistor 31 (of the reference branch) and a gate of an first output branch transistor 51 (of the output branch).

In order to simplify the robust analog counter and reduces its cost—the reference branch 30 is fed by the reference voltage $V_{REF}$. In FIG. 1 the reference branch (RB) 30 includes comparator 33, first RB transistor 31, second RB transistor 32, and resistor. A first input of RB comparator 33 receives $V_{REF}$, and a second input of the RB comparator 33 is connected to the output of the RB comparator 33—for controlling the conductivity of second RB transistor 32 and maintaining a fixed reference current 91 through the RB 30.

The robust analog counter can be used to perform analog counting of various events—for example—to detect that an analog signal reaches a threshold, that an analog signal is within a certain range, that an analog signal is belong a certain threshold, and the like. The analog signal may be generated by or related to a sensor. The sensor may be a single-photon-avalanche-diode (SPAD) or may differ from SPAD. The event may be a detection of a photon by the SPAD.

Figure 2:
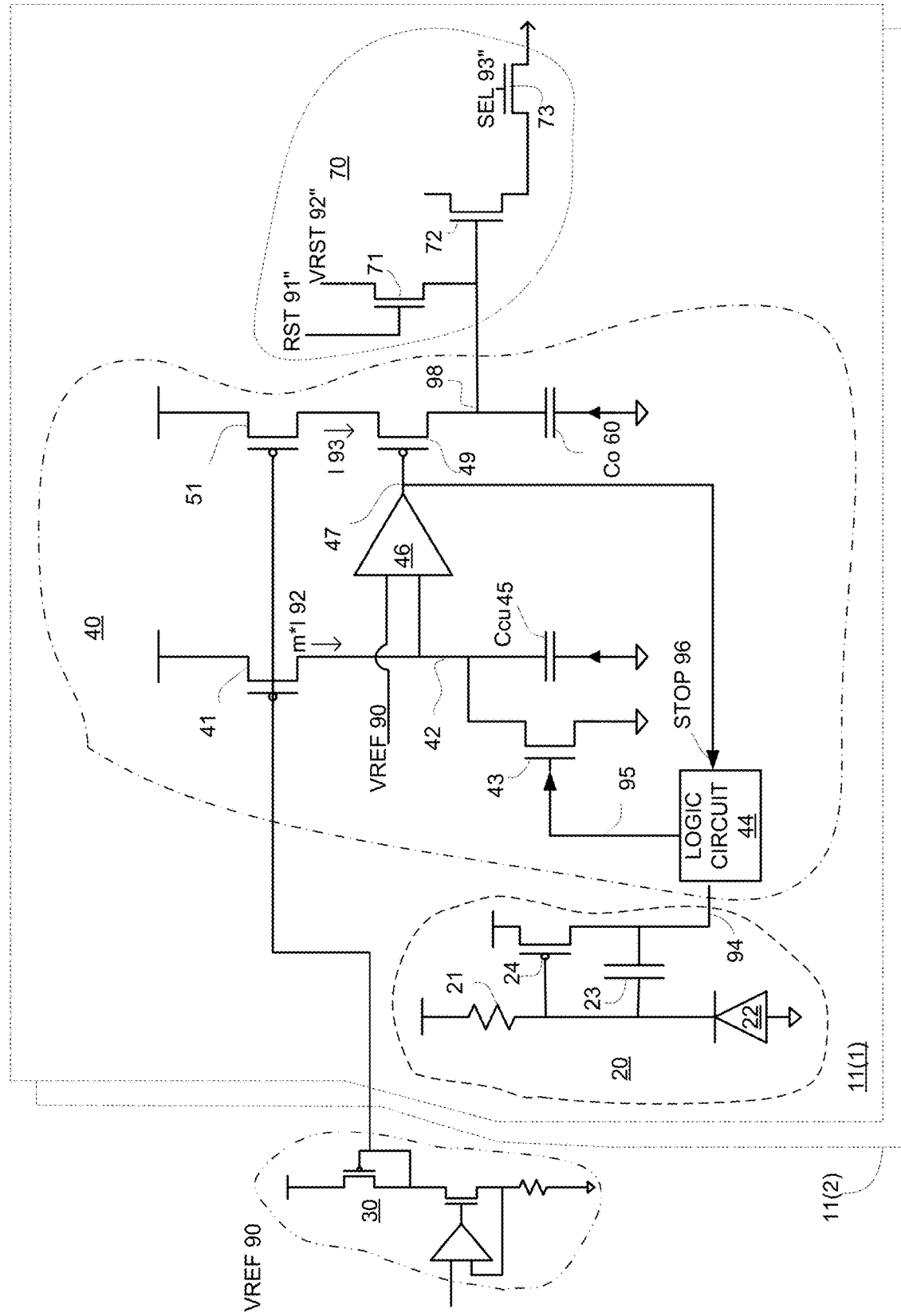
FIG. 2 is an example of a module that includes robust analog counters.

The output branch may be in communication with any readout circuit—for example a pixel readout circuit. The pixel readout circuit may be of any configuration and include any number of transistors—for example be a three transistors (3T) pixel—as illustrated in FIG. 2, FIG. 2 illustrates an example of multiple event counting units such as photon counting units 11(1) and 11(2). There may be more than two photon counting units.

The photon counting units share reference branch 90 and also share an output readout circuit (now shown)—that selects which photon counting unit to read.

Photon counting unit 11(1) includes SPAD 22 and a quenching circuit (the SPAD and the quenching circuit are collectively denoted 20), robust analog counter 40 and pixel readout circuit 70. The quenching circuit includes quenching circuit resistor 21, quenching circuit capacitor 23 and quenching circuit switch 24.

SPAD 22 is being charged to the voltage above the break-down voltage, so single photon hitting the SPAD 22 causes an avalanche. During the avalanche, the voltage across the SPAD 22 is discharged to the value below the break-down voltage. This voltage change is transferred through the quenching circuit capacitor 23 to the logic circuit 44. After the avalanche ends, the SPAD 22 is charged through quenching circuit resistor 21 again to the supply voltage (Vdd).

Figure 3:
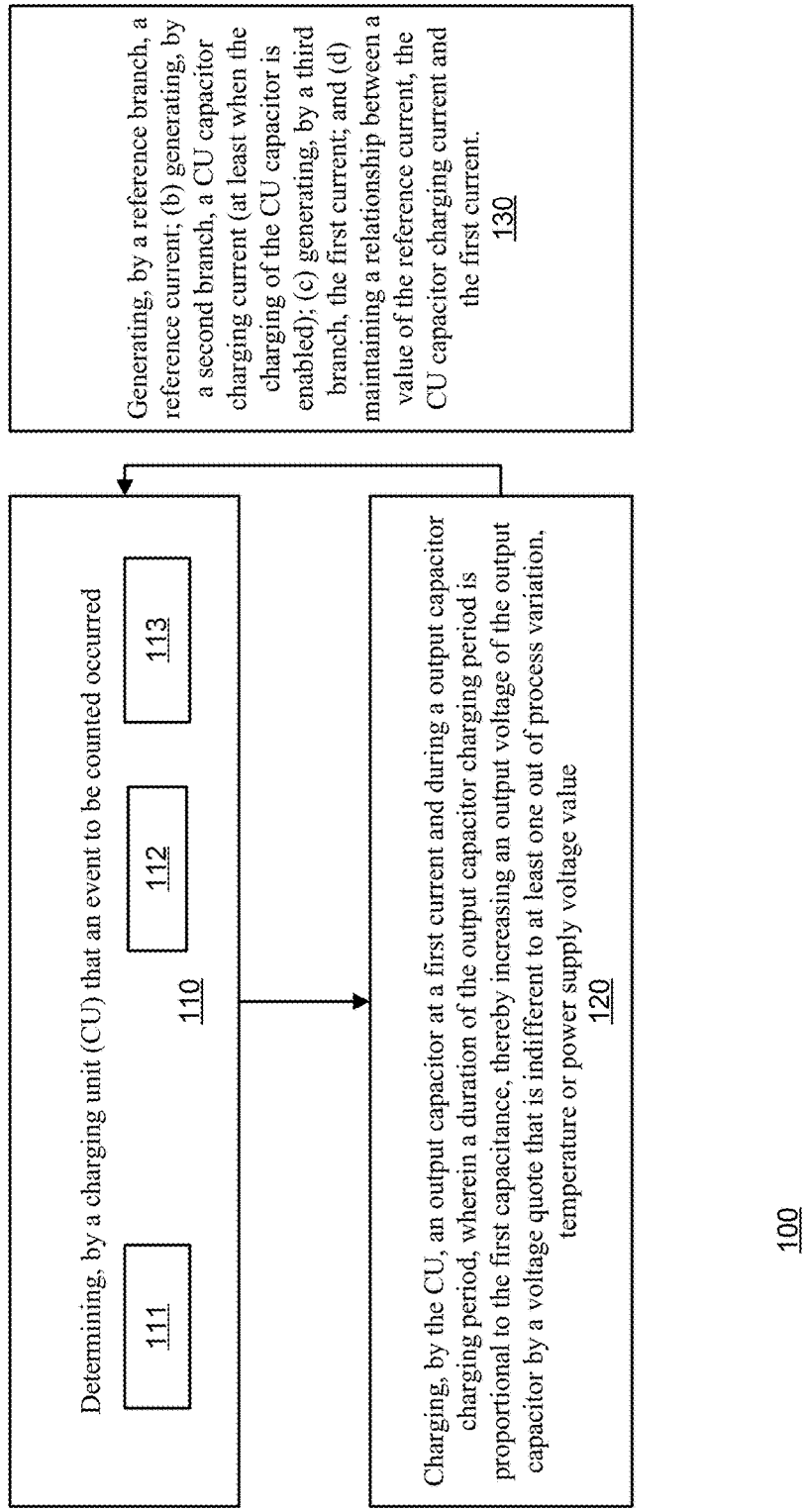
FIG. 3 is an example of a method.

FIG. 3 illustrates method 100 for robust analog counting.

Method 100 may include step 110 of determining, by a charging unit (CU) that an event to be counted occurred.

Step 110 may include step 111 of detecting, by a logic circuit of the CU, the event to be counted.

Step 111 may include step 112 of generating, by the logic circuit, a start signal to a CU switch thereby enabling a charging of the CU capacitor.

Step 111 may include step 113 of receiving, by the logic circuit, an end charging signal from the comparator and stop the charging of the CU capacitor.

Step 110 may be followed by step 120 of charging, by the CU, an output capacitor at a first current and during a output capacitor charging period, wherein a duration of the output capacitor charging period is proportional to the first capacitance, thereby increasing an output voltage of the output capacitor by a voltage quote that is indifferent to at least one out of process variation, temperature or power supply voltage value.

The output capacitor charging period may also be proportional to a value of a reference voltage.

Step 120 may include step 121 of charging a CU capacitor by a CU capacitor charging circuit, between a start point in time in which the event to be counted is detected, and an end point of time in which a voltage of the CU capacitor reaches a value of a reference voltage. The output capacitor charging period may occur between the start point in time and the end point in time.

Step 120 may include step 122 comparing, by a CU comparator, the reference voltage and a voltage of the CU.

Step 120 may include step 123 of enabling the charging of the output capacitor while the voltage of the CU capacitor does not exceed the reference voltage.

Method 100 may include step 130 of (a) generating, by a reference branch, a reference current; (b) generating, by a second branch, a CU capacitor charging current (at least when the charging of the CU capacitor is enabled); (c) generating, by a third branch, the first current; and (d) maintaining a relationship between a value of the reference current, the CU capacitor charging current and the first current.

Step 130 may be executed in parallel to steps 110 and 120.

Any reference to any of the terms "comprise", "comprises", "comprising" "including", "may include" and "includes" may be applied, mutatis mutandis, to any of the terms "consists", "consisting", "consisting essentially of".

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A robust analog counter, comprising:
an output capacitor having a first capacitance;
a charging unit (CU) that is configured to determine that an event to be counted occurred, and charge the output capacitor at a first current and during a output capacitor charging period, wherein a duration of the output capacitor charging period is proportional to the first capacitance, thereby increasing an output voltage of the output capacitor by a voltage quote that is indifferent to at least one out of process variation, temperature or power supply voltage value; wherein the CU comprises a CU capacitor and a CU capacitor charging circuit, wherein the CU capacitor charging unit is configured to charge the CU capacitor between a start point in time in which the event to be counted is detected, and an end point of time in which a voltage of the CU capacitor reaches a value of a reference voltage.

2. The robust analog counter according to claim 1 wherein the output capacitor charging period is also proportional to a value of a reference voltage.

3. The robust analog counter according to claim 1 wherein the output capacitor charging period occurs between the start point in time and the end point in time.

4. The robust analog counter according to claim 1 wherein the CU comprises a comparator that is configured to compare between the reference voltage and a voltage of the CU capacitor and to enable the charging of the output capacitor while the voltage of the CU capacitor does not exceed the reference voltage.

5. The robust analog counter according to claim 1 wherein the CU comprises a logic circuit that is configured to detect the event to be counted.

6. The robust analog counter according to claim 5 wherein the logic circuit is configured to (a) generate a start signal to a CU switch thereby enabling a charging of the CU capacitor and (b) receive an end charging signal from the comparator and stop the charging of the CU capacitor.

7. The robust analog counter according to claim 1 comprising a reference branch for generating a reference current, a second branch for generating a CU capacitor charging current and a third branch for generating the first current; wherein the robust analog counter is configured to maintain a relationship between a value of the reference current, the CU capacitor charging current and the first current.

8. The robust analog counter according to claim 7 wherein the reference branch is fed by the reference voltage.

9. The robust analog counter according to claim 1 wherein the event to be counted is related to a detection sensor of a sensor.

10. The robust analog counter according to claim 1 wherein the event to be counted is detecting a photon by a single-photon-avalanche-diode (SPAD).

11. The robust analog counter according to claim 1 comprising a pixel readout circuit for reading the output voltage of the output capacitor.

12. A method for robust analog counting, the method comprises:
- determining, by a charging unit (CU) that an event to be counted occurred; and
- charging, by the CU, an output capacitor at a first current and during a output capacitor charging period, wherein a duration of the output capacitor charging period is proportional to the first capacitance, thereby increasing an output voltage of the output capacitor by a voltage quote that is indifferent to at least one out of process variation, temperature or power supply voltage value; wherein the method further comprises charging a CU capacitor by a CU capacitor charging circuit, between a start point in time in which the event to be counted is detected, and an end point of time in which a voltage of the CU capacitor reaches a value of a reference voltage.

13. The method according to claim 12 wherein the output capacitor charging period is also proportional to a value of a reference voltage.

14. The method according to claim 12 wherein the output capacitor charging period occurs between the start point in time and the end point in time.

15. The method according to claim 12 comprising comparing, by a CU comparator, the reference voltage and a voltage of the CU; and enabling the charging of the output capacitor while the voltage of the CU capacitor does not exceed the reference voltage.

16. The method according to claim 12 comprising detecting, by a logic circuit of the CU, the event to be counted.

17. The method according to claim 16 comprising: generating, by the logic circuit, a start signal to a CU switch thereby enabling a charging of the CU capacitor; receiving, by the logic circuit, an end charging signal from the comparator and stop the charging of the CU capacitor.

18. The method according to claim 12 comprising generating, by a reference branch, a reference current; generating, by a second branch, a CU capacitor charging current; generating, by a third branch, the first current; and maintaining a relationship between a value of the reference current, the CU capacitor charging current and the first current.

* * * * *